UNITED STATES PATENT OFFICE.

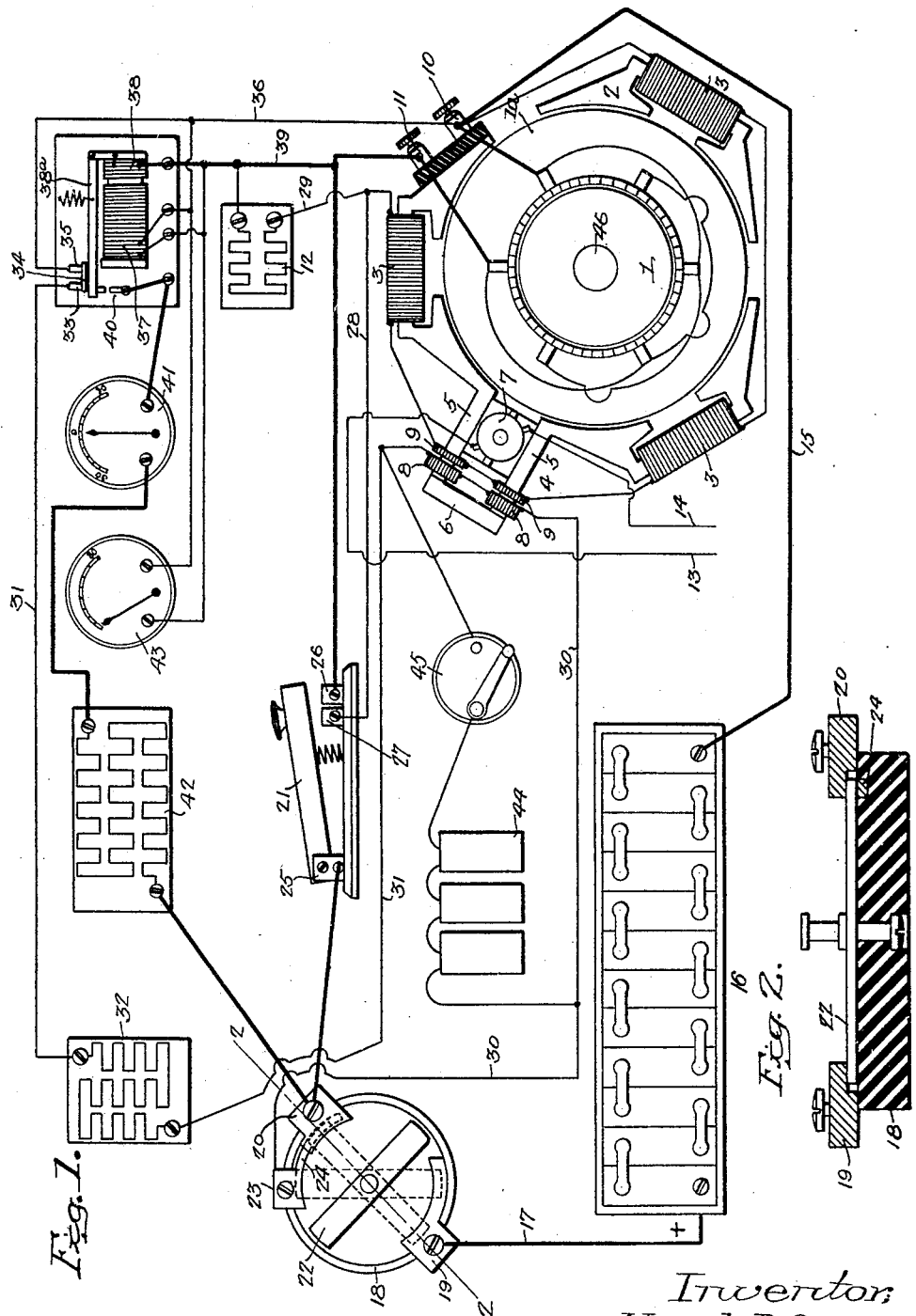

URIAH D. GARVER, OF PHILADELPHIA, PENNSYLVANIA, ASSIGNOR TO G. J. BÜCHLER, OF PHILADELPHIA, PENNSYLVANIA.

STARTING AND IGNITION SYSTEM.

1,395,809.   Specification of Letters Patent.   Patented Nov. 1, 1921.

Application filed May 22, 1918. Serial No. 235,923.

*To all whom it may concern:*

Be it known that I, URIAH D. GARVER, a citizen of the United States, residing in Philadelphia, Pennsylvania, have invented the Starting and Ignition System, of which the following is a specification.

One object of my invention is to provide a novel combination of apparatus so connected and constructed that in the case of the breaking down of the dynamo electric machine customarily used for starting the engine of a motor vehicle and charging the storage battery, or in the event of the storage battery being incapable of supplying current, it shall be possible to utilize a reserve battery such as a small storage battery or several dry cells, for the purpose of maintaining the energization of the field windings of the generator for supplying an igniting current to the ignition system of such an engine.

It is further desired to provide a novel construction of dynamo electric machine which shall include certain elements constituting a motor or a generator, as the case may be, and certain other elements magnetically associated therewith in such manner as to serve as a generator for an ignition system.

Another object of the invention is to provide automatic means for throwing a main battery into circuit in case of the failure of a dynamo electric machine to provide current at the proper voltage to suitably energize the field windings of an ignition generator.

I also desire to provide a system of apparatus which shall include a novel combination of apparatus and circuits for insuring the energization of the field windings of an ignition generator either from a main battery or from a dynamo electric machine independently thereof, the arrangement being such that current shall be provided from the battery in case the voltage of the dynamo electric machine falls below a predetermined point.

Another object of my invention is to provide a system of apparatus for supplying an ignition circuit, which shall include an automatic relay for cutting a battery into circuit with one field winding of an ignition generator under predetermined conditions, such for example as the failure of a main generator to properly energize a second field winding of said generator.

I further desire to provide a system including a dynamo electric machine capable of acting as a motor to crank an internal combustion engine and also of acting as a generator to provide current to charge a storage battery, in combination with a novel form of ignition generator, and hand operated as well as automatic means for controlling the energization of the field windings of this generator so as to insure the production of current thereby, regardless of the condition of the dynamo electric machine and of the storage battery;—the invention contemplating a novel combination of circuits and apparatus for insuring energization of the field of the ignition generator before this is called upon to deliver current to the ignition system.

These objects and other advantageous ends I attain as hereinafter set forth, reference being had to the accompanying drawings, in which, Figure 1 is a diagrammatic representation of the apparatus and circuits comprising my invention; and Fig. 2 is a transverse vertical section on the line 2—2, Fig. 1, illustrating the detail construction of one of the switches forming part of my invention.

In the above drawings, 1ª represents the armature, 2 a part of the frame, and 3 the field windings of a dynamo electric machine 1 capable of being operated, when supplied with current at suitable voltage, to crank an internal combustion engine. This machine is peculiar however, in having its frame and more specifically, that portion thereof included in its magnetic circuit, formed to constitute the frame of an auxiliary generator 4. For this purpose said frame is shown as having two outwardly extending parallel portions 5 whose outer ends are connected by a member 6 at right angles to them.

The extensions 5 have mounted on them two sets of field windings 8 and 9 and are suitably formed to receive between them an armature 7. The field windings 9 are connected in series with the windings 3 of the dynamo electric machine, which are connected in shunt across the terminals 10 and 11 of the latter and there is included in this field circuit a body of resistance 12 for limiting the current flow. The conductors 13 and 14 leading from the armature terminals of the auxiliary or ignition generator 4 are connected to the ignition system of an internal combustion engine, which as it constitutes no part of the present invention, is not illustrated.

One of the main terminals as 10, of the dynamo electric machine 1 is connected through a conductor 15 to one terminal of a storage battery 16 whose second terminal is connected through a conductor 17 to one terminal 19 of a hand switch 18, whose second terminal 20 is connected to one terminal of a foot switch 21. The second terminal of this latter is connected to the second terminal 11 of the dynamo electric machine. The switch 18 is peculiar in that it includes a third terminal or fixed contact 23 having an extension 24 projecting under the contact 20 so that the movable member 22 in one position will simultaneously engage and connect the contacts 19—20 and the extension 24 of the contact 23 and in another position connect the contacts 23 and 19, of which the latter is extended for this purpose.

The foot switch 21 in addition to its main terminals 25 and 26, includes an auxiliary terminal 27 engaged by its blade when this is in its closed position and connected through a conductor 28 with a conductor 29 which connects one end of the field windings 3 of the motor generator with the resistance 12 so as to short circuit the latter when said switch is closed. The auxiliary terminal 23 of the hand switch 18 is connected through a conductor 30 to one end of the field winding 8 of the ignition generator and the second end of this field winding is connected through a conductor 31 and a body of resistance 32 to a relay contact 33 designed to be connected by a blade 34 on an armature 38ª to a second relay contact 35. The latter through a conductor 36 is connected to the terminal 10 of the motor generator.

The blade 34 of the switch 33—35 constitutes part of or is suitably mounted on the armature 38ª of an electromagnet having two windings 37 and 38, respectively connected to conductors 36 and 39 of which the first is connected to the motor generator terminal 10 and the second to the terminal 11. This latter conductor 39 is connected through the second winding 38 of the relay electromagnet, to the armature 38ª thereof, so that when said magnet is suitably energized, the armature electrically engages a fixed contact 40 connected through a current indicating instrument 41 and a body of resistance 42 to the main terminal 20 of the switch 18.

A voltmeter 43 is also preferably connected between the conductors 36 and 39 leading to the dynamo electric machine terminals.

An auxiliary battery 44, such as three dry cells, has one of its terminals connected to the conductor 30 leading to the field winding 8 of the ignition generator and its second terminal connected through a switch 45 to the second terminal of this field winding so that when desired it may be energized from this battery.

Assuming that the storage battery 16 is charged and that it is desired to start the engine on whose shaft 46 the armature of the dynamo electric machine is mounted, the movable member 22 of the switch 18 is placed in position to connect the terminals 19 and 20 and 23 with the terminal 19 and current thereupon flows from the storage battery through the conductor 17, through the movable member 22 of the switch 18, to the terminal 23 thereof, thence through the conductor 30 to the coils 8 of the ignition generator, conductor 31, resistance 32, to the relay contacts 33 and 35, thence through the conductors 36 and 15 to the storage battery. Consequently when the foot switch 21 is closed and the current flow from the storage battery 16 through switches 18 and 21 to the dynamo electric machine, causes this to operate as a motor and crank the engine, the resulting rotation of the armature 7 of the ignition generator causes current to be supplied to the ignition system of the engine which thereupon starts and operates the machine 1 as a generator.

When said machine is operated as a motor in starting the engine, its field winding as well as the coils 9 of the ignition generator are supplied with current from the conductor 28, the other end of the field winding being connected to the second terminal 10 of the dynamo electric machine and thence through the conductor 15 to the storage battery. If the voltage of the latter is less than that of the machine 1 when this operates as a generator, current flows from the terminal 11 through the conductor 39, coil 37 of the relay to the conductor 36 and terminal 10, thereby causing the armature 38ª to move toward the pole piece of said coil into electrical engagement with the contact 40. Current is then free to flow from the terminal 11 of the dynamo electric machine through the conductor 39, coil 38, armature 38ª, contact 40, current indicator 41, resistance 42, switch 18, to the storage battery and thence through the conductor 15 to the dynamo electric machine terminal 10.

The coils 37 and 38 of the relay are so designed that when the storage battery has been charged to the desired point, the armature 38ª is released, by reason of the decreased current flowing in said coil 38 thereby breaking the circuit between the generator and said battery and closing the circuit through the windings 8 of the ignition generator which was broken during the charging operation, When it is desired to supply these field coils of the ignition generator from the storage battery independently of the dynamo electric machine, as might be necessary in case the latter was out of commission for any cause, the movable member 22 of the switch 18 is adjusted to connect the terminal 19 and the terminal 23 but without engaging the terminal 20. In such case the current flows from the battery through the conductor 17, switch 18, conductor 30, field winding 8, resistance 32, conductor 31, relay contacts 33 and 35 and conductors 36 and 15, back to the storage battery. If for any reason the latter also should be out of commission, as might be the case if it was discharged, it would still be possible to operate the ignition generator since current could be supplied to its field windings 8 by closing the switch 45 to place them in circuit with the auxiliary battery 44.

If when the motor generator is charging the battery, and current is flowing through the conductor 39, resistance 12, and conductor 29 to the field windings 3 and 9, the voltage should suddenly drop, the resulting movement of the armature 34 away from the pole piece of the relay electromagnet not only breaks the circuit between the battery and the dynamo electric machine, but also automatically throws said battery into circuit with the second field winding 8 of the ignition generator so that this continues its normal operation;—it being assumed that the movable member 22 of the switch 18 occupies the position connecting the terminal 19 to the terminals 20 and 23. Obviously the switch member 22 may be placed in engagement with the terminals 19 and 23 to the exclusion of the terminal 20 in case it is desired to supply the field winding 8 of the ignition generator from the battery independently of the dynamo electric machine.

From the above description it will be noted that in addition to providing a simple and reliable system whereby the dynamo electric machine may be operated as a motor from the storage battery for the purpose of cranking the engine and thereafter be caused to charge said battery so as to maintain its voltage between predetermined limits, I have associated the ignition generator with the field circuit of said dynamo electric machine in such manner that its field will be energized whenever said dynamo electric machine is in operation. Moreover, even though the dynamo electric machine should become inoperative, one of the field windings of the ignition generator will be automatically switched into circuit with the storage battery, and if this should be incapable of supplying the necessary current, I have provided means whereby said field winding may be energized from a third source provided by an auxiliary battery.

I claim:

1. The combination of a dynamo electric machine; an ignition generator; a storage battery; and automatic means for connecting the storage battery in circuit with the field winding of the ignition generator when the voltage of the dynamo electric machine falls below a predetermined point.

2. The combination of a dynamo electric machine; an ignition generator; a storage battery; and a relay switch for connecting the storage battery in circuit with the field winding of the ignition generator when the voltage of the dynamo electric machine falls below a predetermined point.

3. The combination of a dynamo electric machine; an ignition generator; a storage battery; and a relay switch for connecting the storage battery in circuit with the field winding of the ignition generator when the voltage of the dynamo electric machine falls below a predetermined point, said relay switch including one winding in shunt and a second winding in series, with the armature of said dynamo electric machine.

4. The combination of an ignition generator having two field windings; a dynamo electric machine having its field winding connected in series with one of the field windings of said ignition generator, and in shunt to the armature of the dynamo electric machine; a storage battery connected to be charged from the dynamo electric machine; and a switch for placing the second field winding of the ignition generator in circuit with the storage battery independently of the dynamo electric machine.

5. The combination of a storage battery; a dynamo electric machine; and an ignition generator; with a relay controlled by current from the dynamo electric machine and including two switches of which one is connected to place the field winding of the ignition generator in circuit with the storage battery when the dynamo electric machine voltage is below a predetermined point, the second switch being arranged to connect the storage battery to the dynamo electric machine for charging the same.

6. The combination of a dynamo electric machine; a storage battery charged therefrom; an ignition generator having two separately excited field windings of which one is connected to receive current from the dynamo electric machine; a switch having two operating positions; and connections whereby said switch in one of its positions, simultaneously connects the dynamo electric machine to the storage battery for charging the latter and the second field winding of the ignition generator across the terminals of the storage battery, and in its second position connects the second field winding of the ignition generator in circuit with the storage battery independently of the dynamo electric machine.

7. The combination of a dynamo electric machine; a storage battery having one terminal connected to said dynamo electric machine; a switch connected to the second terminal of the storage battery; two connections between the second terminal of the dynamo electric machine and said switch; a normally open starting switch in one of said connections; a relay switch controlled by the dynamo electric machine in the other connection; a body of resistance normally in circuit with the field winding of the dynamo electric machine; and an auxiliary connection between said starting switch and said field winding for temporarily short circuiting said resistance.

8. The combination of a dynamo electric machine; an ignition generator having two separately excited field windings of which one is connected to be energized by current from the dynamo electric machine; a storage battery having one terminal connected to a terminal of the dynamo electric machine; with a three-point switch having one terminal connected to the storage battery and its second terminal connected to the second terminal of the dynamo electric machine, the second winding of the ignition generator having one terminal connected to the storage battery and its second terminal connected to the third terminal of said switch.

9. The combination of a dynamo electric machine; an ignition generator having two separately excited field windings of which one is connected to be energized by current from the dynamo electric machine; a storage battery having one terminal connected to a terminal of the dynamo electric machine; a three-point switch having one terminal connected to the storage battery and its second terminal connected to the second terminal of the dynamo electric machine, the second winding of the ignition generator having one terminal connected to the storage battery and its second terminal connected to the third terminal of said switch, the fixed and the movable elements of said switch being formed to connect the first to the second and third terminals when said movable element is in one position and to connect the first to the third terminal independently of the second terminal when it is in another position.

In witness whereof I affix my signature,

URIAH D. GARVER.